US008918442B2

(12) United States Patent
Liberty et al.

(10) Patent No.: US 8,918,442 B2
(45) Date of Patent: Dec. 23, 2014

(54) REDUCING BIAS IN HARDWARE GENERATED RANDOM NUMBERS

(75) Inventors: John S. Liberty, Round Rock, TX (US); Marty L. Tsai, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 13/592,295

(22) Filed: Aug. 22, 2012

(65) Prior Publication Data

US 2014/0059099 A1 Feb. 27, 2014

(51) Int. Cl.
*G06F 1/02* (2006.01)
*G06F 7/58* (2006.01)

(52) U.S. Cl.
USPC .......................................... 708/251; 708/250

(58) Field of Classification Search
USPC .................................. 708/250–256
See application file for complete search history.

(56) References Cited

U.S. PATENT DOCUMENTS

| | | | |
|---|---|---|---|
| 6,253,223 B1 | 6/2001 | Sprunk | |
| 7,797,361 B2* | 9/2010 | Lazich et al. | 708/251 |
| 7,890,561 B2 | 2/2011 | Boerstler et al. | |
| 8,281,111 B2* | 10/2012 | Plondke et al. | 712/223 |
| 2007/0168406 A1* | 7/2007 | Meyer | 708/252 |
| 2009/0067618 A1* | 3/2009 | Kumar et al. | 380/28 |
| 2009/0110188 A1 | 4/2009 | Dolgunov et al. | |
| 2010/0106757 A1 | 4/2010 | Matthews, Jr. et al. | |
| 2010/0153478 A1* | 6/2010 | Aliseychik et al. | 708/255 |
| 2011/0119321 A1* | 5/2011 | Ishikawa | 708/250 |
| 2011/0128081 A1* | 6/2011 | Hars | 331/57 |
| 2013/0036078 A9* | 2/2013 | Wilber | 706/22 |
| 2014/0059100 A1 | 2/2014 | Liberty et al. | |

FOREIGN PATENT DOCUMENTS

| | | |
|---|---|---|
| EP | 94254 A | 11/1983 |
| SU | 1716507 A1 | 2/1992 |

OTHER PUBLICATIONS

M. Bucci, L. Germani, R. Luzzi, P. Tommasino, A. Trifiletti, and M. Varanonuovo, "A high-speed IC random-number source for smartcard microcontrollers", IEEE Trans. Circuits Syst. I, Fundam. Theory Appl., vol. 50, No. 11, pp. 1373-1380, 2003.*
U.S. Appl. No. 13/742,436, filed Jan. 16, 2013, In re Liberty, 35 pages.
Salih Ergun, "IC Postprocessing Stage for Random Number Generators and an Alternative Design Methodology", 2011, 5 pages.
Hardware random number generator, Wikipedia, the free encylopedia, accessed online <http://en.wikipedia.org/wiki/Hardware_random_number_generator> as of Jun. 14, 2012, 11 pages.

(Continued)

*Primary Examiner* — Chat Do
*Assistant Examiner* — Matthew Sandifer
(74) *Attorney, Agent, or Firm* — Steven L. Bennett; Amy J. Pattillo

(57) ABSTRACT

A random number generator of a processor comprises a whitener for reducing the bias in random numbers generated by the random number generator. The whitener receives a random number of a first length read by an array of latches with inputs from an array of oscillators. The whitener dynamically creates a mask of the first length based on a parity of at least one previous random number read from the array of latches during at least one cycle prior to reading the random number. The whitener applies a compare operation between the random number and the mask to generate a whitened random number of the first length, with reduced bias, without reducing randomness.

12 Claims, 7 Drawing Sheets

(56) References Cited

OTHER PUBLICATIONS

Notice of Allowance, mailing date Aug. 18, 2014, U.S. Appl. No. 13/742,436, filed Jan. 16, 2013, In re Liberty, 31 pages.

* cited by examiner

```
for (i=0; i<NUM_RN; i++)
{
    //Left shift, then invert every other bit
    baseMask = (baseMask << 1) ^ 0xAA.....A;

//Use parity of previous random number for last bit of baseMask
    //Every other whitening iteration, use inverted parity
    baseMask[63] = parity(unwhitenedRN[i-1]) ^ (i%2);

//Determine appliedMask
    appliedMask = baseMask;
    if(i%2)  appliedMask = flip(appliedMask);

//Whiten
    whitenedRN[i] = unwhitenedRN[i] ^ appliedMask;
```

FIG. 4

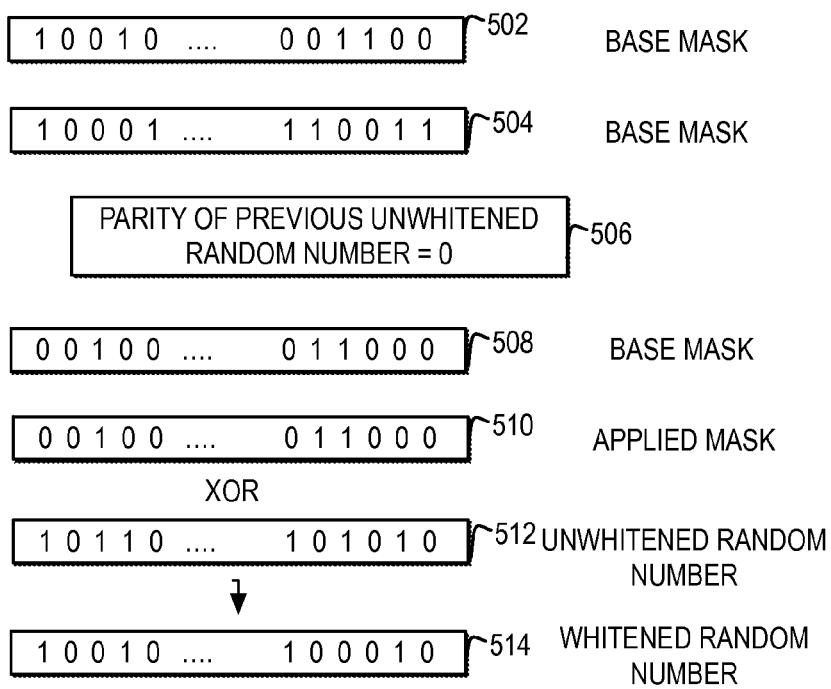

FIG. 5

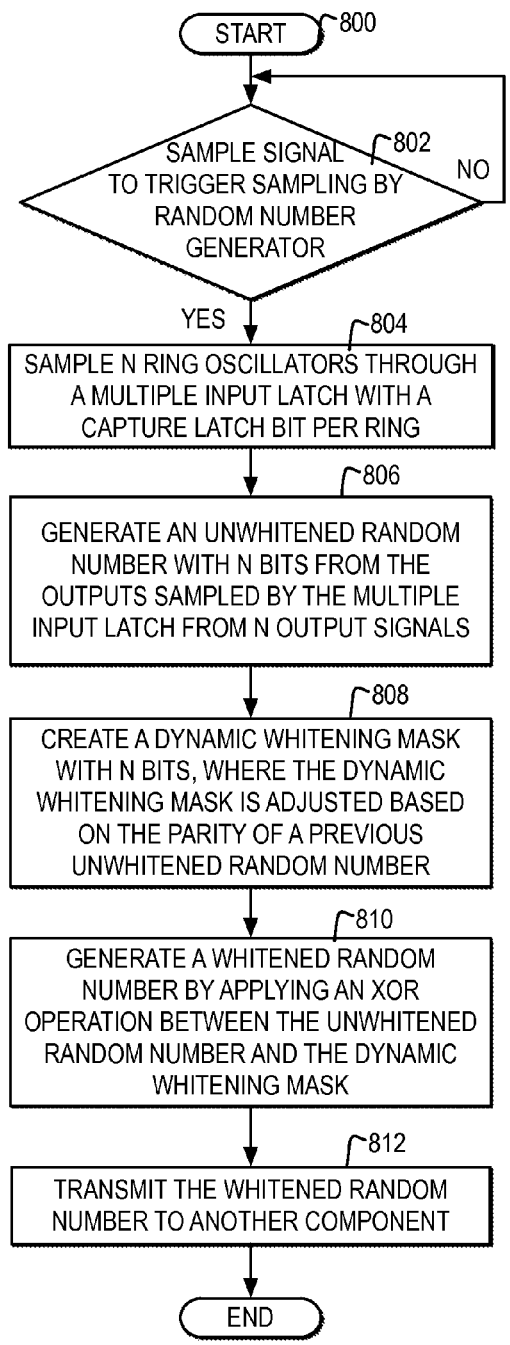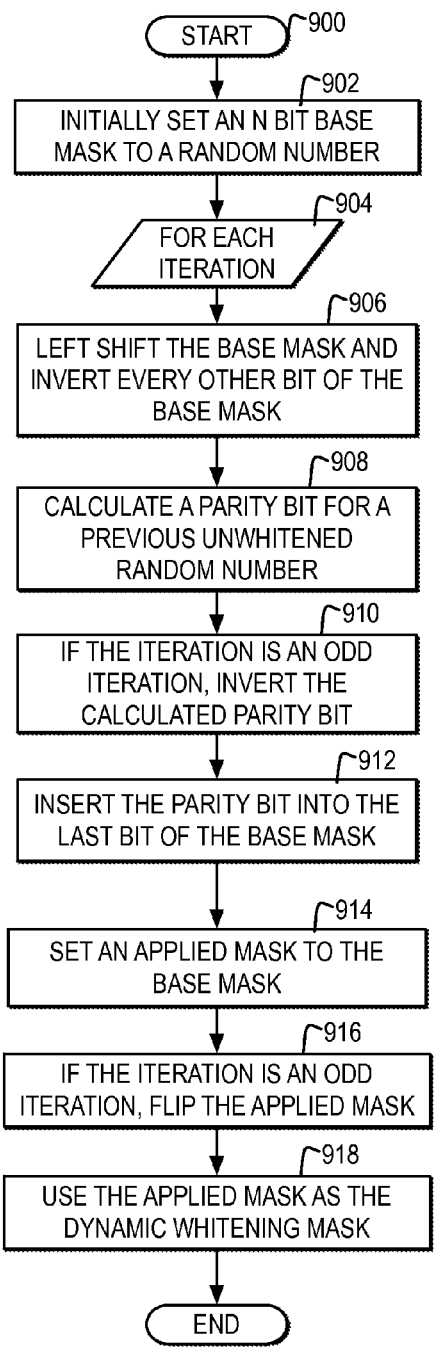
FIG. 8
FIG. 9

REDUCING BIAS IN HARDWARE GENERATED RANDOM NUMBERS

BACKGROUND

1. Technical Field

The embodiment of the invention relates generally to reducing bias from random numbers generated by a random number generator.

2. Description of Related Art

Some processors use random number generators to generate random numbers that are then used for security for the processor. In a bit-stream produced by a hardware random number generator that reads the output from oscillators to produce a random number seed, the random number output by the oscillators tends to be slightly biased towards either more ones or more zeroes due to variations in the duty cycle of each oscillator away from a 50% duty cycle. For a biased random number to be considered usable as a random number, for passing security requirements of bias and randomness, the bias must be reduced to a closer ideal of 50% of each of zeroes and ones while still maintaining a sufficient level of randomness.

BRIEF SUMMARY

Therefore, in view of the foregoing, there is a need for a method, system, and computer program product for a random number generator to efficiently reduce the bias in a generated random number to a percentage closer to 50% of each of ones and zeros while maintaining sufficient randomness in the generated random numbers.

An embodiment of the invention provides a random number generator of a processor that comprises a whitener for reducing the bias in random numbers generated by the random number generator. The whitener receives a random number of a first length read by an array of latches with inputs from an array of oscillators. The whitener dynamically creates a mask of the first length based on a parity of at least one previous random number read from the array of latches during at least one cycle prior to reading the random number. The whitener applies a compare operation between the random number and the mask to generate a whitened random number of the first length, with reduced bias, without reducing randomness.

In another embodiment a computer program product for managing a random number generator comprises a computer readable storage medium having program code embodied therewith. The program code is executable by a processor to receive, by the processor, a random number of a first length read by a plurality of latches with inputs from a plurality of oscillators. The program code is executable by a processor to dynamically create, by the processor, a mask of the first length based on a parity of at least one previous random number read from the plurality of latches during at least one cycle prior to reading the random number. The program code is executable by a processor to apply, by the processor, a compare operation between the random number and the mask to generate a whitened random number of the first length.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 4 illustrates a flow diagram of one example of steps performed by a whitener to generate an applied mask and apply the applied mask to an unwhitened random number, to generate a whitened random number that maintains randomness, but with reduced bias;

FIG. 5 illustrates a block diagram of one example of a dynamically created whitening mask for an iteration and one example of an application of the whitening mask to an unwhitened random number to generate a whitened random number;

FIG. 8 illustrates a high level logic flowchart of a process and program for generating an unbiased random number;

FIG. 9 illustrates a high level logic flowchart of a process and program for creating a dynamic whitening mask.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
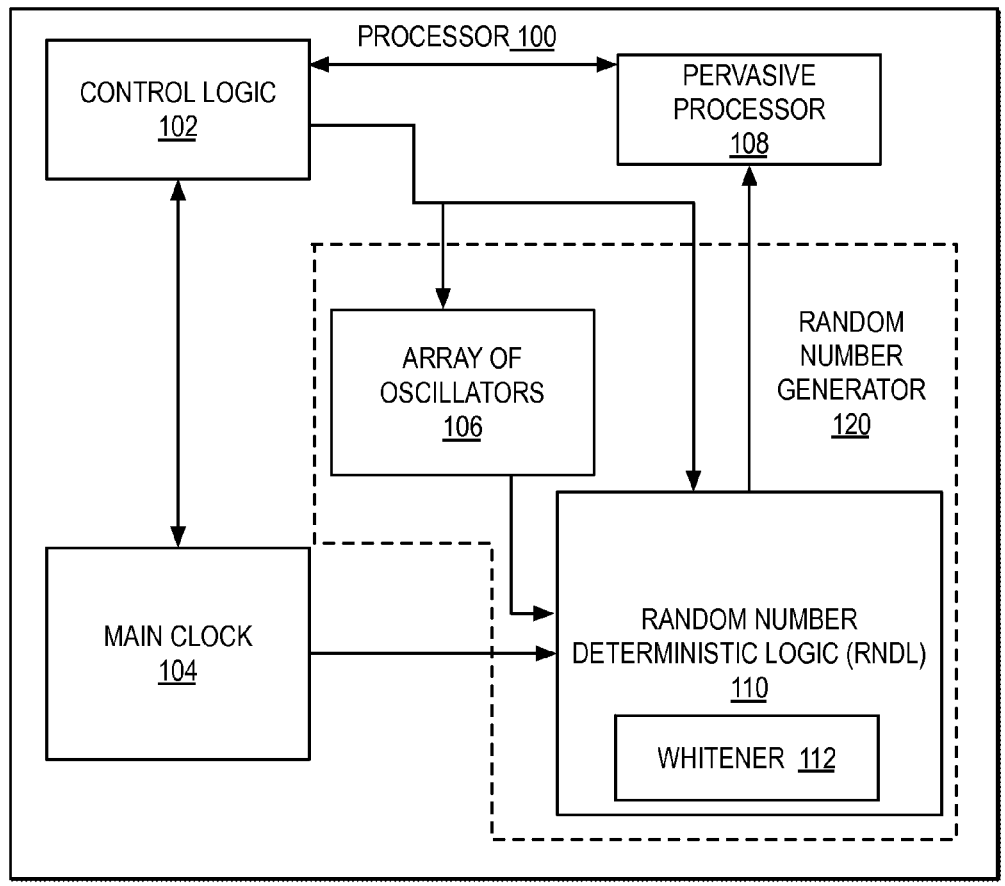
FIG. 1 illustrates a block diagram of a processor that houses a random number generator that includes a whitener for efficiently reducing the bias in random numbers generated from an array of oscillators while maintaining the randomness introduced by the array of oscillators.

FIG. 1 illustrates a block diagram of a processor that houses a random number generator that includes a whitener for efficiently reducing the bias in random numbers generated from an array of oscillators while maintaining the randomness introduced by the array of oscillators.

Figure 7:
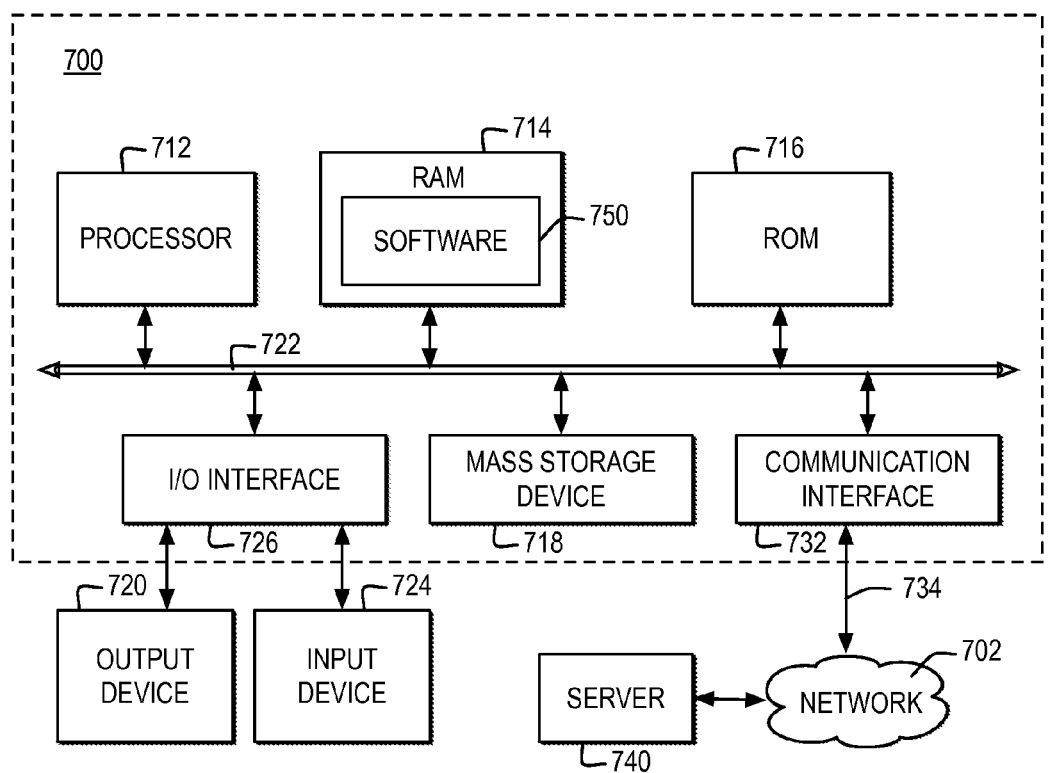
FIG. 7 illustrates one example of a schematic of a computer system in which the present invention may be implemented.

In the example, a processor 100, as illustrated by processor 712 in FIG. 7, can connect to many different components. In one example, processor 100 includes a control logic 102. Control logic 102 sends control signals to the devices within processor 100 in accordance with a set of instructions executing within processor 100. In addition, in one example, control logic 102 sends control signals to a main clock 104, an array of oscillators 106, a pervasive processor 108, and random number determination logic (RNDL) 110 of processor 100. In one example, main clock 104 feeds a global clock signal to control logic 102 and RNDL 110.

In one example, array of oscillators 106 contains a number of oscillators that may each implement slightly different circuitry to each produce signals that oscillate at a different frequency. Each of the oscillators within array of oscillators 106 may be small in size and use lower power. While in the example illustrated in FIG. 1, array of oscillators 106 are illustrated placed together in a box, in the implementation of the invention, array of oscillators 106 may be placed anywhere on processor 100 together in one area or distributed in multiple areas. In addition, the components illustrated within processor 100, including, but not limited to, control logic 102, main clock 104, array of oscillators 106, pervasive 108, and RNDL 110, when implemented on processor 100, may be distributed throughout processor 100 in additional or alternate configurations.

In the example, a random number generator 120 is represented by array of oscillators 106 and RNDL 110, and may include additional hardware and software not illustrated. In the example, random number generator 120 uses outputs of array of oscillators 106 to feed RNDL 110. RNDL 110 captures the outputs of array of oscillators 106 in a latch system and generates a random number from the captured outputs of array of oscillators 106.

In one example, array of oscillators 106 includes 64 digital ring oscillators and RNDL 110 implements a 64 bit double stage capture latch with one latch bit per ring oscillator. In the example, a random number may refer to as a sequence of numbers or symbols that lack any pattern. In one example, each ring oscillator may have one of five, seven, or nine levels of inversion from 1 NAND gate and four, six or eight inverters, where the output of each NAND gate, used to enable the rings, drives a capacitive load, with several stages of inversion before the output register to help with the duty cycle bias, and the drive strength of the gates varies.

In the example, by generating a random number from the captured outputs of array of oscillators 106, random number generator 102 illustrates one example of a hardware based, true random number generator, where random number generator 102 uses the physical phenomena of accumulated jitter in free running oscillators as the source of entropy to produce random numbers. In one example, jitter is caused by the thermal and shot noise quantum effects in each ring oscillator gate. In other examples, random number generator 120 may implement a pseudo random number generator, in place of or in conjunction with array of oscillators 106, where a pseudo random number generator uses software to produce random numbers based on a seed value.

RNDL 110 may sample the outputs from array of oscillators 106, as triggered by main clock 104, at a rate that is set to the time needed to wait between reads of the ring oscillators for the read value not to be related to the previous value. In one example, the time needed to wait between reads of the ring oscillators for the read value not to be related to the previous value is set a time long enough for the accumulated jitter to exceed half a cycle.

In the example, random number generator 102, as a hardware based, true random number generator, has a tendency to produce a non-uniform distribution of ones and zeros, where the tendency is referred to as the bias of random number generator 102. In particular, in one example, array of oscillators 106 includes 64 ring oscillators, where each ring oscillator tends to be slightly biased towards either more ones or more zeros. In one example, RNDL 110 generates a digital binary stream from the captured outputs of array of oscillators 106, where the digital binary stream may include data that either includes more ones or more zeroes, representing biased data output.

In the example, a stream of individual bit values output from array of oscillators 106, as captured by RNDL 110, may be biased 46% to 55% ones. Outputs of biased random numbers with a bias range that spans from 46% to 55% ones may be unacceptable for use as random values by processor 100 or other components requesting a random number from processor 100. In particular, a bias range that spans from 46% to 55% ones, among multiple factors, may cause the biased digital binary stream generated from the outputs of array of oscillators 106 to fail the National Institute of Standards and Technology (NIST) test suite. In one example to pass the NIST test for bias, for a minimum sample size of 100 Mbits, or 100 streams of 1,000,000 bits each, an acceptable bias needs to be between about 49.75% and 50.25% ones on 96 out of 100 streams to pass the test. The 46% to 55% bias range that may be inherent in the raw digital binary stream generated by RNDL 110, from the outputs of array of oscillators 106, is not acceptable for passing a NIST test.

To reduce the bias in the binary data stream captured by RNDL 110 to a percentage of ones and zeroes closer to 50%, without losing any data and without losing entropy, RNDL 110 runs the captured binary data stream through a whitener 112. Whitener 112 adjusts the bias in the raw data output captured from array of oscillators 106 to generate a whitened random number with a percentage of ones and zeroes close to 50% without reducing the entropy of the generated random number and without reducing the length of the binary data captured from array of oscillators 106.

As will be further described, whitener 112 adjusts the bias of the raw data output captured from array of oscillators 106 by applying a whitening mask to the raw data output. In one example, whitener 112 dynamically creates the whitening mask, of the same length as the raw data output captured by RNDL 110, using parity bits calculated for each read of the random number output by array of oscillators 106. Whitener 112 applies the whitening mask to the entire string of raw data output captured by RNDL 110 and outputs a whitened random number of the same length as the raw data output captured by RNDL 110. Whitener 112 may be implemented through hardware or through software, with low overhead.

In one example, processor 100 may produce a random number, through RNDL 100, on demand. For example, processor 100 may request a random number from RNDL 110 for every power up. In another example, pervasive processor 108 may request a random number from RNDL 110 for data transmissions external to processor 100. In one example, pervasive processor 108 may control one or more of power supplies, random number generator 120, and clocks on processor 100, including main clock 104. In another example, processor 100 may automatically produce a random number, through RNDL 100, responsive to one or more triggers, such as a rule for automated random number production specified in control logic 102, pervasive processor 108, or RNDL 110.

In the example illustrated, RNDL 110, transmits the generated random number to pervasive processor 108, pervasive processor 108 transmits the generated random number to control logic 102, and control logic 102 can provide the generated random number to components external to processor 100. In additional or alternate embodiments, RNDL 110 may transmit the generated random number to one or more additional or alternate components on processor 100, including but not limited to, control logic 102, and RNDL 110 may transmit the generated random number, directly or indirectly, to one more components external to processor 100.

Figure 2:
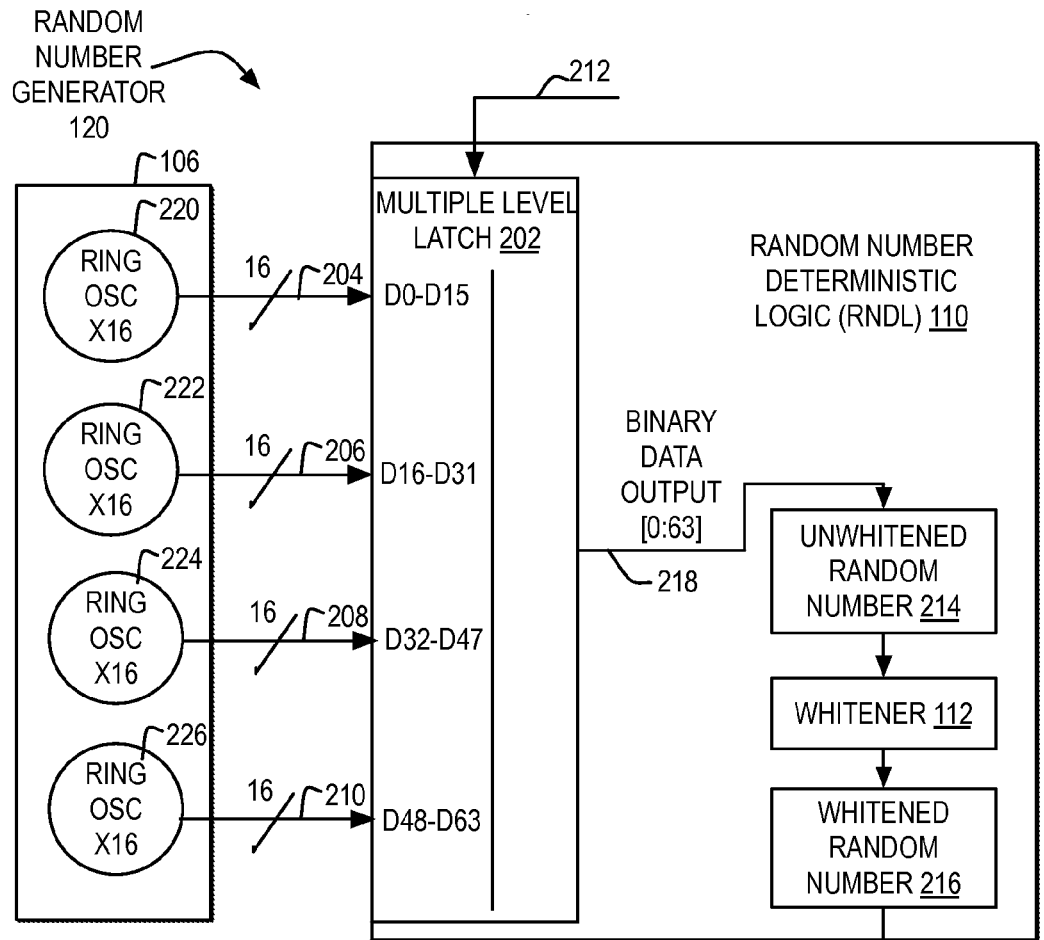
FIG. 2 illustrates a block diagram of one example of a random number generator including an array of oscillators and a whitener.

FIG. 2 illustrates a block diagram of one example of a random number generator including an array of oscillators and a whitener. In the example, array of oscillators 106 includes one or more ring oscillators, illustrated in the example in groupings of sixteen individual oscillators, illustrated at reference numerals 220, 222, 224, and 226. In one example, within array of oscillators 106, or within each grouping of oscillators illustrated at reference numerals 220, 222, 224, and 226, or within oscillators positioned next to one another, the oscillators operate at different high frequencies, respectively, such that no two frequencies are harmonically related. In one example, the oscillators within array of oscillators 106 are independent of each other, and no integer multiple exists between the frequencies of any two oscillators. By using oscillators with frequencies that are not harmonically related, the oscillators within array of oscillators 106 may be housed in close proximity with one another without exhibiting injection locking effects that reduce randomness.

In the example, the output of each oscillator within array of oscillators 106 feeds into a multiple level latch 202 through input lines 204, 206, 208, and 210. In one example, multiple level latch 202 includes two stages of 64 bit registers, where a digital bit representing each of the 64 outputs from the 64 oscillators illustrated in array of oscillators 106 are latched through the two stages of 64 bit registers of multiple level latch 202. In one example, multiple level latch 202 captures the outputs of array of oscillators 106 as digital bits of 1's or 0's by capturing a digital 1 when the captured oscillating signal outputs a high voltage and by capturing a digital 0 when the captured oscillating signal outputs a low voltage, as illustrated by D0-D15, D16-D31, D32-D47, and D48-D63. By latching the outputs through two stages of 64 bit registers, the metastability of the output is protected.

In one example, multiple input latch 202 outputs a digital bit representing each oscillating signal in response to the sample signal 212, provided by a clock signal output from main clock 104. For example, multiple input latch 202 may sample the oscillating signals on the rising edge of the global clock signal input through sample signal 212.

In particular, in the example, multiple level latch 202 outputs a 64 bit binary data output 218. As previously discussed with reference to FIG. 1, the bias of the binary data output captured by multiple level latch 202 from array of oscillators 106 may vary outside a permissible variable range. In one example, where array of oscillators 106 consist of multiple multi-stage free-running ring oscillators, each operates with random jitter. The random jitter, introduced by both deterministic (for example, specific cause such as power supply noise) and random content, provide the source of entropy in binary data output 218, but also effect the amount of bias present in binary data output 218.

In the example, RNDL 110 may read binary data output 218 for a particular cycle as unwhitened random number 214. In one example, array of oscillators 106 may require multiple clock cycles to reach oscillation patterns with sufficient randomness, wherein whitener 112 only reads unwhitened random number 214 from binary data output 218 after a particular number of clock cycles, such as the base RNG sample time. RNDL 110 includes a whitener 112 that reads unwhitened random number 214, dynamically creates a whitening mask based on the parity of one or more previous unwhitened random numbers, and applies the whitening mask to unwhitened random number 214 to generate a whitened random number 216 that maintains sufficient entropy, or randomness, but with reduced bias.

Figure 3:
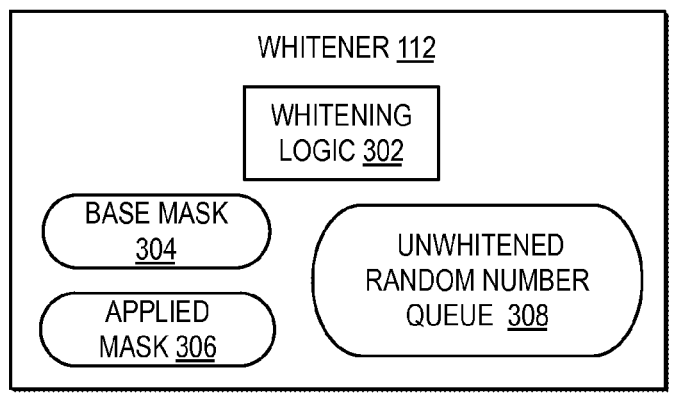
FIG. 3 illustrates a block diagram of one example of a whitener for applying a mask to an unwhitened random number to reduce the bias in the random number while maintaining randomness.

FIG. 3 illustrates a block diagram of one example of a whitener for applying a mask to an unwhitened random number to reduce the bias in the random number while maintaining randomness. In the example, whitener 112 includes whitening logic 302, which may be implemented through hardware or software.

In the example, on a sampling triggered by sample signal 212, whitener 112 loads unwhitened random number 214 into unwhitened random number queue 308. Unwhitened random number queue 308 may include only the current unwhitened random number and the most recently stored previous whitened random number or unwhitened random number queue 308 may include a queue of the current unwhitened random number along with the previous whitened random numbers stored for multiple cycles. In another example, unwhitened random number queue 308 may only store a single random number and whitening logic 302 may wait to load unwhitened random number 214 into unwhitened random number 214 until a next cycle is triggered.

In addition, initially, whitener 112 may load unwhitened random number 214 into base mask 304 or may initially load a random number of a same length as unwhitened random number 214 into base mask 304 from another source. In another example, because base mask 304 is stored and there is a potential that this value can be manipulated, whitening logic 302 may generate a unique random number for base mask 304 for each iteration. In one example, to generate the initial random number for base mask 304 or to generate a unique random number for base mask 304 for each iteration, because the parity bit contains the combined entropy of all 64 rings, whitening logic 302 may read the values in binary data output 218 65 times faster, at 1/65 of the base RNG sample time of whitener 112, calculate the parity bit from each of the first 64 reads and use the parity bits to create base mask 304, and use the $65^{th}$ read of binary data output 218 as unwhitened random number 214. In particular, one of the factors introducing randomness into each bit in binary data output 218 is from the clock drift, or jitter, between the ring oscillator and the sample clock, When the parity is calculated for all 64 bits of binary data output 218, by taking an XOR or XNOR across the stream of bits in binary data output 218, the clock drift between the ring oscillators is effectively combined to extract a $65^{th}$ bit of randomness from the ring oscillators, which is different from the 64 random bits in binary data output 218. In the example of reading binary data output 218 at 1/65 of the base RNG sample time, since only the parity bit is being calculated by combining the accumulated relative clock drift of 64 different rings, sampling for parity bits to generate base mask 304 can be performed at a higher rate than the base RNG sample time for sampling unwhitened random number 214. In addition, while the 64 bits of binary data output 218 may have a measurable bias, the parity bit calculated from the 64 bits of binary data output 218 will have minimal, if any bias, because the output bias of the parity bit taken across a 64 bit value has a resultant output bias of $2e^n$, where e is the probability of a bit in the stream producing a 0 and equal to $\frac{1}{2}+e$, or the bias $-0.5$, and n is the number of bits XORed together. In the example illustrated in Table 1, even if the sampled unwhitened random number has a bias of 0.55 towards 0, e is equal to 0.05, the resultant bias in the parity bit calculated from the 64 bit sampled unwhitened random number is $2*(0.05)^{64}$, or about $1\times10^{-83}$, which is minimal. By creating base mask 304 from the 64 parity bits taken from sampling binary data output 218 64 times, the bits of base mask 304 will have minimal bias, if any.

Whitening logic 302 adjusts the random number in base mask 304 and generates an applied mask 306. Whitening logic 302 may also adjust applied mask 306, before applying applied mask 306 to unwhitened random number 214. Whitening logic 302 applies applied mask 306 to unwhitened random number 214 to generate a whitened random number 216 for output by RNDL 110. In the example, applied mask 306, unwhitened random number 214, and the resulting whitened random number 216 are all a same length.

In one example, whitening logic 302 adjusts the random number in base mask 304 by first left shifting the numbers in base mask 304 and by inverting every other bit. In addition, in one example, whitening logic 302 dynamically adjusts the random number in base mask 304 by setting the last bit of base mask 304 to the parity of a previous number from among unwhitened random number queue 308 or from another sampling of binary data output 218. Further, in adjusting the random number in base mask 304 by setting the last bit of base mask 304 by using the parity of a previous number in unwhitened random number queue 308, the parity bit is first inverted, every other iteration. In addition, in adjusting the random number in base mask 304 by setting the last bit of base mask 304 by using the parity of a previous number in unwhitened random number queue 308, whitened logic 302 may first randomly select a random number from among unwhitened random number queue 308 and use the parity of the randomly selected random number. By taking the parity bit of a 64 bit random number captured from the 64 ring oscillators of array of oscillators 106, a $65^{th}$ random bit, with sufficient entropy for maintaining the randomness of base mask 304, is effectively captured from the outputs of the 64 ring oscillators. In addition, by using the parity bit of a 64 bit random number to dynamically generate base mask 304, even though the underlying 64 bit random number from which the parity bit is taken may have a bias, the parity bit inserted into base mask 304 has a minimal bias of $2e^n$, as previously described, therefore the resulting value in base mask 304 has minimal, if any bias, with sufficient entropy.

In one example, whitening logic 302 sets applied mask 306 to the random number generated for base mask 304. Whitening logic 302 may adjust applied mask 306, such as by flipping the applied mask, every other iteration.

In one example, whitening logic 302 applies applied mask 306 to unwhitened random number 214 for an iteration through a compare operation between unwhitened random number 214 and applied mask 306, to generate whitened random number 216. As described herein, the compare operation may include, but is not limited to, an exclusive or (XOR) operation or an exclusive nor (XNOR) operation, between unwhitened random number 214 and applied mask 306. References herein to an XOR operation may also be implemented through an XNOR operation. An XOR operation implements logical inequality, such that when an XOR operation is performed, the result is a value that is true if exactly one of the operands has a value of true. An XNOR operation implements logical equality, such that when an XNOR operation is performed, the result is a value that is true if both the operands have the same value. In the example, whitened random number 216 maintains the randomness in unwhitened random number 214, but with less bias than unwhitened random number 214.

In particular, applied mask 306 is generated and applied to unwhitened number 214 to reduce the bias inherent in unwhitened random number 214 based on the bias in the duty cycle of each oscillator, from which unwhitened random number 214 is generated. In one example, Table 1 illustrates an example of how applying either an XOR or XNOR operation between unwhitened random number 214 and applied mask 306 yields whitened random number 216 with reduced bias. In the example in Table 1, an example is illustrated assuming each bit within unwhitened random number 214 has a 55% bias toward being a 0 and that applied mask 306 has no bias, or a minimal amount of bias. In the example, the probability that the resulting bit in whitened random number 216, will be a 1, whether the biased unwhitened bit is XORed or XNORed with the applied mask bit, is 0.0275+0.0225, or 0.5, an unbiased value. Therefore, applying only a single compare operation, such as an XOR or XNOR operation, between biased unwhitened random number 214 and unbiased applied mask 306, yields whitened random number 216 with no bias.

TABLE 1

| Biased unwhitened bit | Applied mask bit | XOR result | XNOR result | Likelihood |
|---|---|---|---|---|
| 0 | 0 | 0 | 1 | 0.55*0.5 = 0.275 |
| 0 | 1 | 1 | 0 | 0.55*0.5 = 0.275 |
| 1 | 0 | 1 | 0 | 0.45*0.5 = 0.225 |
| 1 | 1 | 0 | 1 | 0.45*0.5 = 0.225 |

In addition, the XOR operation or XNOR operation is used to preserve entropy because a random bit XORed or XNORed with a non-random bit will still result in a random bit. Therefore, by XORing or XNORing unwhitened random number 214 with applied mask 306, the entropy of whitened random number 216 is at least as good as the entropy of unwhitened random number 214. In addition, by XORing or XNORing unwhitened random number 214 with applied mask 306, where both unwhitened random number 214 and applied mask 306 are of a same length, no bit length is lost in generating whitened random number 216.

In addition to or in lieu of the bias correction performed by whitener 112, RNDL 110 or another element could include a software element that applies a cryptographic hash function, such as MD5, SHA-1, or RACE Integrity Primitives Evaluation Message Digest (RIPEMD-160) to all or part of binary data output 218 or whitened random number 216, to reduce bias. The software overhead required to apply a cryptographic hash function to the entire length of binary data output 218, particularly when binary data output 218 is 64 bits in length, however, is significantly larger than the hardware or software overhead required to implement whitener 112 within RNDL 110, and therefore application of a cryptographic hash function for performing bias correction would be less efficient, and with a higher software overhead, than performing bias correction through whitener 112 alone.

In another example, in addition to or in lieu of the bias correction performed by whitener 112, RNDL 110 or another element could implement a software based pseudorandom number generator that generates a high-quality cryptographically secure random number and RNDL 110 may perform an XOR operation between binary data output 218 and the high-quality cryptographically secure random number. The software overhead required to implement a software based pseudorandom number generator to generate a high-quality cryptographically secure random number of a same length as binary data output 218, particularly when binary data output 218 is 64 bits in length, however, is significantly larger than the hardware or software overhead required to implement whitener 112 within RNDL 110, and therefore generation of a high-quality cryptographically secure random number by a software based pseudorandom number generator to XOR with binary data output 218 for performing bias correction would be less efficient, and with a higher software overhead, than performing bias correction through whitener 112 alone.

In another example, in addition to or in lieu of the bias correction performed by whitener 112, RNDL 110 or another element could apply a John von Neumann algorithm to binary data output 218 that considers bits two at a time, taking one of three actions of first, when two successive bits are equal, they are not used as a random bit, second, a sequence of 1, 0 becomes a 1, and third, a sequence of 0, 1 because a zero. One limitation of the John von Neumann algorithm is that while the algorithm may eliminate some bias, the algorithm does not assure randomness in its output and running the algorithm once may yield a loss of up to ¾ of the data rate. Therefore, applying the John von Neumann algorithm for performing bias correction, to achieve the same bias correction performed by whitener 112 alone, would be less efficient than performing bias correction through whitener 112.

In another example, in addition to or in lieu of the bias correction performed by whitener 112, RNDL 110 or another element could simply take two or more uncorrelated unwhitened random bit streams and XOR the bit streams together to correct bias. In the example, if the probability of the bit stream producing a 0 is ½+e, where −½≤e≤½, then e is the bias of the bitstream. In the example, if two uncorrelated bit streams with bias e are XORed together, then the bias of the result will be $2e^2$, with a 2 to 1 reduction in the data rate. To correct the bias to meeting percentages within 49.75% to 50.25% bias, RNDL 110 would need to XOR three or four streams, yielding a 3 to 1 or 4 to 1 reduction in the data rate, to achieve the same bias correction performed by whitener 112 without reducing the data rate.

FIG. 4 illustrates a flow diagram of one example of steps performed by a whitener to generate an applied mask and apply the applied mask to an unwhitened random number, to generate a whitened random number that maintains randomness, but with reduced bias. In the example, whitening logic code 402 illustrates multiple steps that may be performed by whitening logic 302. In the example, in whitening logic code 402, for each iteration, as described by "i=0; <NUM_RN; i==", in a first step, base mask 304 is left shifted and every other bit is inverted, as directed by "baseMask=(baseMask <<1)^0xAA...A". In a next step of whitening logic code 402, the last bit of base mask 304, in an example of a 64 bit number, is set to the parity of the previous unwhitened random number from previous unwhitened random number queue 308, and for every other iteration, the parity bit is inverted, as described by "baseMask[63]=parity(unwhitenedRN[i−1])^(i % 2)". In a next step of whitening logic code 402, applied mask 306 is set to the value in base mask 304, and for every other iteration, the value in applied mask 306 is flipped, as described by "appliedMask=baseMask" and "if(i % 2) appliedMask=flip (appliedMask)". In a next step of whitening logic code 402, unwhitened random number 214 is logically XOR'd with applied mask 306, as described by "whitenedRN[i]=unwhitenedRN[i]^appliedMask". In one example, the "^" illustrated in whitening logic code 402 represents a caret, which indicates a bitwise XOR operation. In additional or alternate embodiments, whitening logic code 402 may include additional or alternate code steps and may be implemented in additional or alternate programming languages.

FIG. 5 illustrates a block diagram of one example of a dynamically created whitening mask for an iteration and one example of an application of the whitening mask to an unwhitened random number to generate a whitened random number. In the example, as illustrated at reference numeral 502, a base mask include a random number including multiple digital bits. In the example, for an iteration where "i" is set to "2", as illustrated at reference numeral 504, the whitener creates a dynamic whitening mask by shifting the bits in the base mask to the left and inverting every other bit. As illustrated at reference numeral 506, the whitener calculates a parity of a previous unwhitened random number, where the parity calculated is a 0 bit. As illustrated at reference numeral 508, the whitener replaces the last bit of the base mask with the parity bit. As illustrated at reference numeral 510, the whitener sets an applied mask value to the value of the base mask. As illustrated in the result at reference numeral 514, the whitener applies an XOR operation between the applied mask illustrated at reference numeral 510 and an unwhitened random number illustrated at reference numeral 512, to generate a whitened random number for the iteration.

Figure 6:
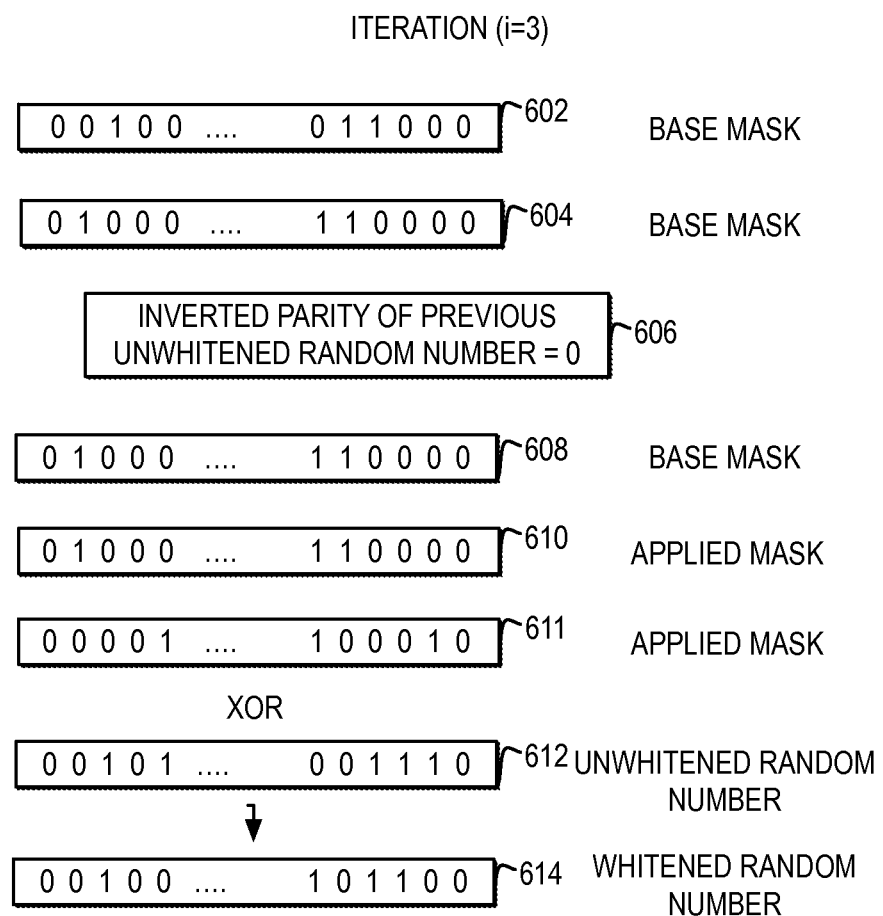
FIG. 6 illustrates a block diagram of one example of a dynamically created whitening mask for a next iteration and one example of an application of the whitening mask to a next unwhitened random number to generate a whitened number.

FIG. 6 illustrates a block diagram of one example of a dynamically created whitening mask for a next iteration and one example of an application of the whitening mask to a next unwhitened random number to generate a whitened number. In the example, the base mask illustrated at reference numeral 602 includes the random number in the base mask illustrated at reference numeral 508 from the previous iteration. In the example, for a next iteration where "i" is set to "3", the whitener creates a dynamic whitening mask for the current iteration by shifting the bits in the base mask to the left and inverting every other bit, as illustrated at reference numeral 604. As illustrated at reference numeral 606, the whitener calculates a parity of a previous unwhitened number and inverts the parity bit, where the inverted parity bit is a 0 bit. As illustrated at reference numeral 608, the whitener replaces the last bit of the base mask with the inverted parity bit. As illustrated at reference numeral 610, the whitener sets an applied mask to value to the value of the base mask. As illustrated at reference numeral 611, the whitener flips the value in the applied mask. In addition, in the example, the whitener applies an XOR operation between the applied mask illustrated at reference numeral 611 and an unwhitened random number illustrated at reference numeral 612, to generate a whitened random number for the iteration, as illustrated at reference numeral 614.

FIG. 7 illustrates one example of a schematic of a computer system in which the present invention may be implemented. The present invention may be performed in a variety of systems and combinations of systems, made up of functional components, such as the functional components described with reference to computer system 700 and may be communicatively connected to a network, such as network 702.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power. Where multiple processors share bus 722, additional controllers (not depicted) for managing bus access and locks may be implemented. In one example, processor 712 and other processors implemented in computer system 700 may implement one or more of the components illustrated in processor 100 in FIG. 1.

Processor 712 may be at least one general-purpose processor such as IBM® PowerPC® (IBM and PowerPC are registered trademarks of International Business Machines Corporation) processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems within a network including, but not limited to, an adapter, a switch, a cluster system, and a grid environment. One or more of the functional components of RNDL 110 and whitener 112 may be specified in software 750.

Figure 10:
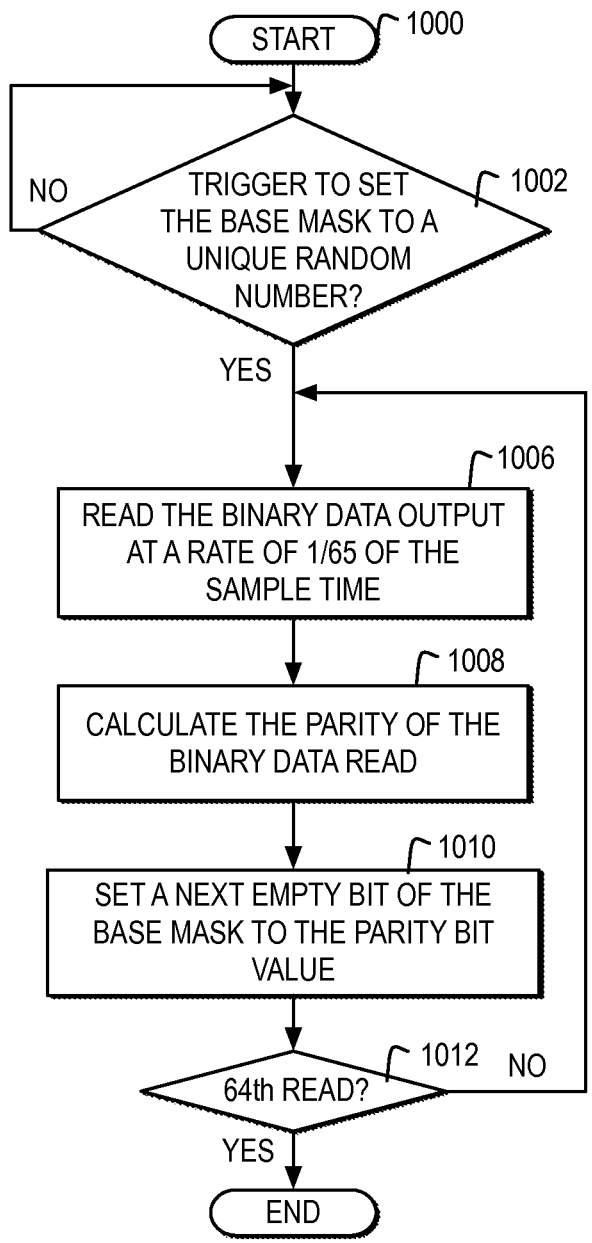
FIG. 10 illustrates a high level logic flowchart of a process and program for setting a base mask.

In one embodiment, the operations performed by processor 712 may control the operations of flowchart of FIGS. 8, 9, and 10 and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 718, a random access memory (RAM), such as RAM 714, a read-only memory (ROM) 716, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 700, partly on the user's computer, as a stand-alone software package, partly on the user's computer and partly on a remote computer or entirely on the remote computer or server. In the latter scenario, the remote computer may be connected to the user's computer through any type of network, such as network 702, through a communication interface, such as network interface 532, over a network link that may be connected, for example, to network 702.

In the example, network interface 732 includes an adapter 734 for connecting computer system 700 to network 702 through a link. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 700, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 700, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 732, the network link to network 702, and network 702 may use electrical, electromagnetic, or optical signals that carry digital data streams. The signals through the various networks and the signals on network 702, the network link to network 702, and network interface 732 which carry the digital data to and from computer system 700, may be forms of carrier waves transporting the information.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

FIG. 8 illustrates a high level logic flowchart of a process and program for generating an unbiased random number. In the example, the process and program start at block 800 and thereafter proceed to block 802. Block 802 illustrates a determination whether a sample signal that triggers sampling by the random number generator is received. If a sample signal that triggers sampling by the random number generator is received, then the process passes to block 804. Block 804 illustrates sampling the N ring oscillators through a multiple input latch with a capture latch bit per ring. Next, block 806 illustrates generating an unwhitened random number with N bits from the outputs sampled by the multiple input latch from N output signals from the multiple input latch. Thereafter, block 808 illustrates creating a dynamic whitening mask with N bits, where the dynamic whitening mask is adjusted based on the parity of a previous unwhitened random number generated from outputs sampled by the multiple input latch. Next, block 810 illustrates generating a whitened random number by applying an XOR operation between the unwhitened random number and the dynamic whitening mask. Thereafter, block 812 illustrates transmitting the whitened random number to another component, and the process ends.

FIG. 9 illustrates a high level logic flowchart of a process and program for creating a dynamic whitening mask. In the example, the process and program start at block 900 and thereafter proceed to block 902. Block 902 illustrates initially setting an N bit base mask to a random number. Next, block 904 illustrates a series of steps repeated for each iteration, where the steps may be triggered when block 808 is executed for each iteration, to create the dynamic whitening mask with N bits. In one example, the series of steps may be set to only a single iteration such that the base mask is reset for each random number generated. Block 906 illustrates left shifting the base mask and inverting every other bit of the base mask. Thereafter, block 908 illustrates calculating a parity bit for a previous unwhitened random number generated from the outputs sampled during a previous iteration by the multiple input latch from the N ring oscillators. Next, block 910 illustrates, if the iteration is an odd iteration, inverting the calculated parity bit. Next, block 912 illustrates inserting the current parity bit into the last bit of the base mask. Thereafter, block 914 illustrates, setting an applied mask to the base mask. Next, block 916 illustrates, if the iteration is an odd iteration, flipping the applied mask. Thereafter, block 918 illustrates using the applied mask as the dynamic whitening mask with N bits, and the process ends.

FIG. 10 illustrates a high level logic flowchart of a process and program for setting a base mask. In the example, the process starts at block 1000 and thereafter proceeds to block 1002. Block 1002 illustrated a determination whether a trigger is received to set the base mask to a unique random number for each iteration, or for an initial base mask. If a trigger is received to set the base mask to a unique random number for each iteration or for an initial base mask, then the process passes to block 1004. Block 1004 illustrates reading the binary data output at a rate of ⅟₆₅ of the sample time, where the sample time is the number of cycles that the whitener requires to sample an unwhitened random number. Block 1006 illustrates calculating the parity of the binary data read. Block 1008 illustrates setting a next empty bit of the base mask to the parity bit value. Block 1010 illustrates a determination whether the read was the $64^{th}$ read and the base mask is full. At block 1010 if the read was not the $64^{th}$ read, then the process returns to block 1006. At block 1010 if the read was the $64^{th}$ read, then the process ends and the next read of the binary data output is read for the unwhitened random number.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A random number generator of a processor, comprising:
    a whitener operative to receive a random number of a first length read by a plurality of latches with inputs from a plurality of oscillators;
    the whitener operative to dynamically create a mask of the first length based on a parity of at least one previous random number read from the plurality of latches during at least one cycle prior to reading the random number; and
    the whitener operative to apply a compare operation between the random number and the mask to generate a whitened random number of the first length.

2. The random number generator of claim 1, further comprising:
    the plurality of oscillators of a same number as the first length, wherein each oscillator operates at a different frequency and wherein the operating frequencies of each oscillator are not harmonically related; and
    the plurality of latches of a same number as the first length, wherein each latch receives an input from a separate oscillator, receives a sample signal, and produces an output signal of the oscillator in response to the sample signal.

3. The random number generator of claim 1, further comprising:
    the whitener operative to dynamically create the mask comprising a base mask of the first length by initially setting the base mask to a random number;
    the whitener operative to left shift the plurality of bits of the base mask;
    the whitener operative to calculate the parity bit of said at least one previous random number; and
    the whitener operative to insert the parity bit into the last position of the plurality of bits of the base mask.

4. The random number generator of claim 3, further comprising:
    the whitener operative to invert every other bit of the plurality of bits of the base mask.

5. The random number generator of claim 3, further comprising:
    the whitener operative to invert the parity bit for every other iteration; and
    the whitener operative to insert the parity bit into the last position of the plurality of bits of the base mask.

6. The random number generator of claim 3, further comprising:
    the whitener operative to set an applied mask to the base mask;
    the whitener operative to flip the plurality of bits of the applied mask every other iteration; and
    the whitener operative to apply the applied mask as the mask in the compare operation between the random number and the mask.

7. The random number generator of claim 1, further comprising:
    the whitener operative to read a separate binary data output from each of the plurality of latches at a rate of one sixty-fifth of the sample rate applied to sample the random number;
    the whitener, for each separate binary data output read at the rate of one sixty-fifth of the sample rate, operative to calculate a separate parity value of each separate binary data output;
    the whitener, for each separate parity value calculated, operative to set a next empty bit of the mask to each separate parity value; and
    the whitener, responsive to completing a sixty-fourth read, to apply the mask.

8. The random number generator of claim 1, wherein the compare operation comprises at least one from among an exclusive or operation and an exclusive nor operation.

9. A computer program product for managing a random number generator, the computer program product comprising a non-transitory computer readable storage medium having program code embodied therewith, the program code executable by a processor to:
    receive, by the processor, a random number of a first length read by a plurality of latches with inputs from a plurality of oscillators;
    dynamically create, by the processor, a mask of the first length based on a parity of at least one previous random number read from the plurality of latches during at least one cycle prior to reading the random number; and
    apply, by the processor, a compare operation between the random number and the mask to generate a whitened random number of the first length.

10. The computer program product of claim 9, further comprising the program code executable by the processor to:
    dynamically create, by the processor, the mask comprising a base mask of the first length by initially setting the base mask to a random number;
    left shift, by the processor, the plurality of bits of the base mask;
    calculate, by the processor, the parity bit of said at least one previous random number; and
    insert, by the processor, the parity bit into the last position of the plurality of bits of the base mask.

11. The computer program product of claim 10, further comprising the program code executable by the processor to:
    invert, by the processor, every other bit of the plurality of bits of the base mask.

12. The computer program product of claim 9, further comprising the program code executable by the processor to:
    invert, by the processor, the parity bit for every other iteration; and
    insert, by the processor, the parity bit into the last position of the plurality of bits of the base mask.

* * * * *